United States Patent
Ebnother et al.

[15] 3,678,057
[45] July 18, 1972

[54] 1,3,4,4A,5,9B-HEXAHYDRO-5-PHENYL-2H-INDENO[1,2-C]-PYRIDINES

[72] Inventors: Anton Ebnöther, Arlesheim; Jean-Michel Bastian; Fulvio Gadient, both of Birsfelden, all of Switzerland

[73] Assignee: Sandoz Ltd. also known as Sandoz AG, Basle, Switzerland

[22] Filed: March 26, 1970

[21] Appl. No.: 23,076

[30] Foreign Application Priority Data

| April 8, 1969 | Switzerland | 5258/69 |
| May 6, 1969 | Switzerland | 6911/69 |
| June 11, 1969 | Switzerland | 8891/69 |
| June 16, 1969 | Switzerland | 9145/69 |
| Sept. 9, 1969 | Switzerland | 13610/69 |
| Dec. 10, 1969 | Switzerland | 18379/69 |
| Dec. 11, 1969 | Switzerland | 18422/69 |

[52] U.S. Cl..............260/293.54, 260/240 R, 260/290 H, 260/293.73, 260/293.8, 260/293.81, 260/293.83, 260/293.84, 260/294.8 G, 260/295 R, 260/297 R, 424/267
[51] Int. Cl.......................................................C07d 39/00
[58] Field of Search...............260/293 B, 293.4 D, 294.7 C

[56] References Cited

UNITED STATES PATENTS

3,408,353 10/1968 Jucker et al............................260/293

FOREIGN PATENTS OR APPLICATIONS

1,175,676 12/1969 Great Britain.........................260/293

Primary Examiner—Henry R. Jiles
Assistant Examiner—G. Thomas Todd
Attorney—Gerald D. Sharkin, Robert S. Honor, Frederick H. Weinfeldt, Richard E. Vila and Walter F. Jewell

[57] ABSTRACT

The invention concerns novel (4aRS,5SR,9bSR)- and (4aRS,5SR,9bRS)-1,3,4,4a,5,9b-hexahydro-5-phenyl-2H-indeno[1,2-c]-pyridine compounds of formula:

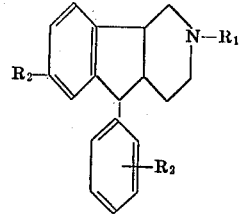

in which either $R_1$, $R_2$ and $R_3$ are hydrogen, or $R_1$ is hydrogen, lower alkyl, alkenyl or alkinyl, $R_2$ is chlorine, bromine, fluorine or lower alkyl, and $R_3$ is hydrogen, chlorine, bromine, lower alkyl, alkylthio or alkoxy, or trifluoromethyl, and acid addition salts thereof.

The compounds exhibit a serotonin-antagonistic effect. Compounds wherein $R_1$ is hydrogen also exhibit an antiphlogistic effect. Compounds wherein $R_1$ is lower alkyl, alkenyl or alkinyl also exhibit analgesic properties.

27 Claims, No Drawings

1,3,4,4A,5,9B-HEXAHYDRO-5-PHENYL-2H-INDENO[1,2-C]-PYRIDINES

The present invention relates to new (4aRS,5SR,9bSR)- and (4aRS,5SR,9bRS)-1,3,4,4a,5,9b-hexahydro-5-phenyl-2H-indeno[1,2-c]pyridines of formula I,

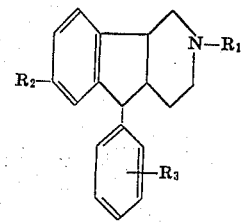

I in which either $R_1$, $R_2$ and $R_3$ signify hydrogen,
or $R_1$ signifies hydrogen, a lower alkyl, alkenyl or alkinyl radical,
$R_2$ signifies chlorine, bromine, fluorine or a lower alkyl radical, and
$R_3$ signifies hydrogen, chlorine, bromine, fluorine, a lower alkyl, alkylthio or alkoxy radical, or trifluoromethyl.

Compounds having the fundamental structure represented by formula X

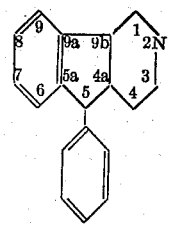

X have at least three centers of asymmetry in the tricyclic ring system, i.e. the carbon atoms in positions 4a, 5 and 9b. Therefore, theoretically there may exist at least four isomers, which differ from each other by the position of the substituents at the centers of asymmetry.

The nomenclature of R.S.Cahn, C.K.Ingold and V.Prelog, Angewandte Chemie 78, 413 (1966), is used herein to define the relative configurations of the hydrogen atoms bonded to the carbon atoms at positions 4a, 5 and 9b of the tricyclic ring system.

| Name | Position of the hydrogen atoms | |
|---|---|---|
| (4aRS,5SR,9bSR) | 4a/9b trans | 4a/5 trans |
| (4aRS,5SR,9bRS) | 4a/9b cis | 4a/5 trans |
| (4aRS,5RS,9bRS) | 4a/9b cis | 4a/5 cis |

According to the present invention, a process for the production of a (4aRS,5SR,9bSR) or (4aRS,5SR,9bRS) compound of formula I is characterized by a. reacting a (4aRS,5SR,9bSR) or (4aRS,5SR,9bRS) compound, respectively, of formula Ia,

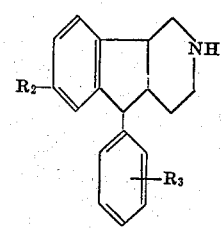

Ia in which $R_2$ and $R_3$ have the above significance, with a compound of formula II, $$R_1^I - X$$ II in which $R_1^I$ signifies a lower alkyl, alkenyl or alkinyl radical, and X signifies halogen or the acid radical of a reactive ester, in the presence of a basic condensation agent, to give a (4aRs,5SR,9bSR) or (4ARS,5SR,9bRS) compound, respectively, of formula Ib

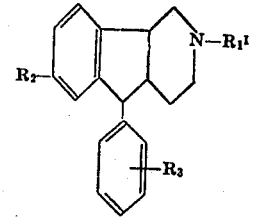

Ib in which $R_1^I$, $R_2$ and $R_3$ have the above significance, or b. cyclizing a compound of formula IIIa, IIIb or IIIc,

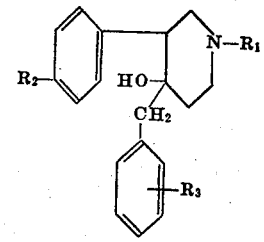

IIIa

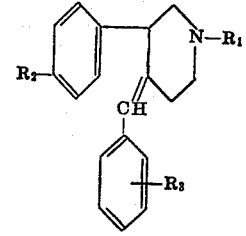

IIIb

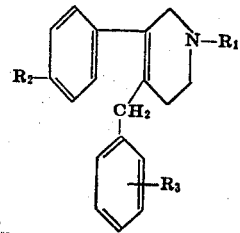

IIIc in which $R_1$, $R_2$ and $R_3$ have the above significance, or a mixture of the compounds of formulas IIIb and IIIc, with polyphosphoric acid, or c. cyclizing a compound of formula IIId,

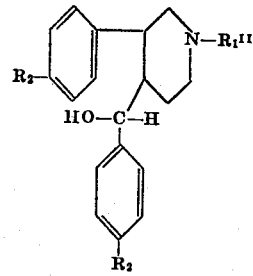

IIId in which $R_1$ signifies hydrogen, a lower alkyl or alkenyl radical, and $R_2$ has the above significance, with polyphosphoric acid, to produce a compound of formula Ic,

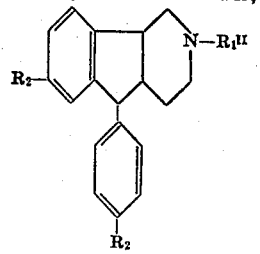

Ic in which $R_1$ and $R_2$ have the above significance, or d. reducing a (4aRS,5SR,9bSR) or (4aRS,5SR,9bRS) compound, respectively, of formula Ie,

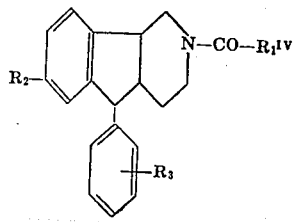

Ie in which $R_1$ signifies hydrogen, a lower alkyl or alkoxy radical, and $R_2$ and $R_3$ have the above significance, with lithium aluminum hydride, aluminum hydride or diborane, in a solvent which is inert under the reaction conditions, to produce a (4aRS,5SR,9bSR) or (4aRS,5SR,9bRS) compound, respectively, of formula Id,

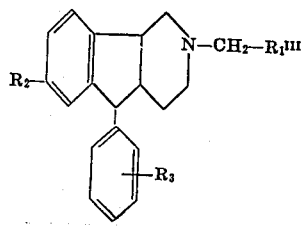

Id in which $R_1$ signifies hydrogen or a lower alkyl radical, and $R_2$ and $R_3$ have the above significance, or e. splitting off the methyl or benzyl radical from a (4aRS,5S R,9bRS) or (4aRS,5SR,9bRS) compound, respectively, of formula If,

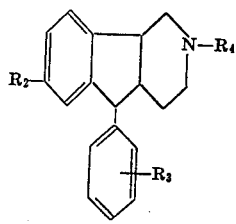

If in which $R_4$ signifies the methyl or benzyl radical, and $R_2$ and $R_3$ have the above significance, to produce a (4aRS,5SR,9 bSR) or (4aRS,5SR,9bRS) compound, respectively, of formula Ia, or f. removing the benzyl radical hydrogenolytically from a (4aRS,5SR,9bSR) or (4aRS,5SR,9bRS) compound, respectively, of formula Ig,

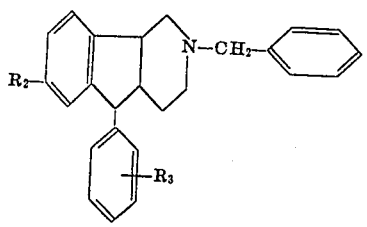

Ig in which $R_2$ and $R_3$ have the above significance, to produce a (4aRS,5SR,9bSR) or (4aRS,5SR,9bRS) compound, respectively, of formula Ia, or g. heating a (4aRS,5RS,9bRS) compound of formula I, of formula Ii,

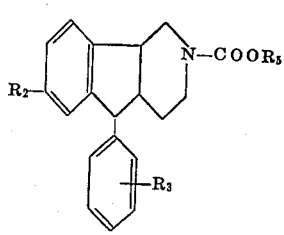

Ii in which $R_2$ and $R_3$ have the above significance, and $R_5$ signifies a lower alkyl radical, a phenyl or benzyl radical, or of formula In,

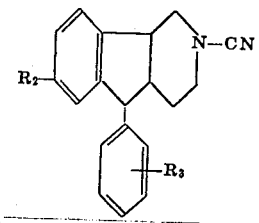

In in which $R_2$ and $R_3$ have the above significance, in an alkaline medium, to produce a (4aRS,5SR,9bRS) compound of formula I, and, where necessary, separating mixtures of (4aRS,5SR,9bSR) and (4aRS,5SR,9bRS) compounds to isolate one or each isomer.

Process (a) is effected by reacting a (4aRS,5SR,9bSR) or (4aRS,5SR,9bRS) compound of formula Ia with a compound of formula II, in which X preferably signifies halogen or an alkyl- or arylsulphonic acid radical, such as a methane-, benzene- or p-toluenesulphonic acid radical. The reaction is conveniently effected in an organic solvent which is inert under the reaction conditions, e.g. a chlorinated hydrocarbon such as chloroform, or a lower alcohol such as ethanol, or a lower ketone such as acetone, or an aromatic hydrocarbon such as xylene, or a di(lower)alkyl-carboxylic acid amide such as dimethyl formamide. Preferably the reaction is effected at an elevated temperature, e.g. at the boiling temperature of the reaction mixture, under reflux. Generally the reaction has a duration of about 1 to 5 hours. Examples of suitable basic condensation agents are alkali metal carbonates such as sodium carbonate or potassium carbonate, or tertiary organic bases such as triethylamine.

For the cyclization in accordance with process (b) the reaction is optionally effected in a solvent which is inert under the reaction conditions, e.g. a cyclic hydrocarbon such as benzene, toluene, xylene or tetraline. The reaction is preferably effected at a temperature between about 80° and 150° C. Generally the reaction has a duration of 1 to 10 hours.

The cyclization in accordance with process (c) is effected in a manner analogous to process (b). Generally the reaction period in this case is between 30 minutes and 24 hours.

For the production of (4aRS,5SR,9bSR) or (4aRS,5SR,9 bRS) compounds of formula Id in accordance with process (d) a cyclic ether which is inert under the reaction conditions may conveniently be used as solvent, e.g. tetrahydrofuran or dioxane.

The splitting off of the methyl or benzyl radical from the (4aRS,5SR,9bSR) or (4aRS,5SR,9bRS) compounds of formula If in accordance with process (e) is preferably effected reacting a (4aRS,5SR,9bSR) or (4aRS,5SR,9bRS) compound of formula If with a chloroformic acid ester of formula IV,

IV.

in which $R_5$ signifies a lower alkyl radical, a phenyl or benzyl radical, to produce a urethane of formula Ii, and converting this urethane by acid or basic hydrolysis into a (4aRS,5SR,9 bSR) or (4aRS,5SR,9bRS) compound, respectively, of formula Ia.

The reaction of components of formula If with the chloroformic acid esters of formula IV is preferably effected in a solvent which is inert under the reaction conditions, e.g. an aromatic hydrocarbon such as anhydrous benzene, and at an elevated temperature, e.g. at the boiling temperature of the reaction mixture. For this reaction the chloroformic acid esters of formula IVa,

IVa.

in which $R_5{}^1$ signifies a lower alkyl radical, are especially preferred as starting materials.

The urethanes of formula Ii may either be purified in manner known per se or used as such for the subsequent hydrolysis thereof.

The removal of the —COOR₅ radical from the urethanes of formula I*i* by hydrolysis may be effected with acids, e.g. mineral acids such as hydrochloric acid, or bases, e.g. alkali metal hydroxides such as potassium or sodium hydroxide, in a solvent which is inert under the reaction conditions, e.g. a lower alcohol such as n-butanol, preferably at the boiling temperature of the reaction mixture.

The urethanes of formula I*h*,

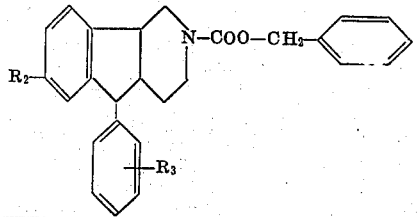

I*h* in which R₂ and R₃ have the above significance, and which are a special case of the urethanes of formula I*i* obtained above, may alternatively be split by catalytic hydrogenation. Preferably, palladium catalysts are employed for the catalytic hydrogenation, e.g. palladium on active charcoal, and preferably hydrogenation is effected under mild conditions, e.g. at about room temperature and normal pressure.

In accordance with a further embodiment of process (e) a (4aRS,5SR,9bSR) or (4aRS,5SR,9bRS) compound of formula I*f* is reacted with cyanogen bromide to produce a compound of formula I*n*, and the cyanamide is subjected to hydrolysis. For this reaction an aromatic hydrocarbon such as benzene or toluene may, for example, be used as solvent which is inert under the reaction conditions. The hydrolysis of the cyanamides may, for example, be effected by heating with strong alkali or dilute mineral acids, e.g. with dilute hydrochloric acid.

The hydrogenolytic removal of the benzyl radical in accordance with process (f) may be effected with palladium catalysts in a solvent which is inert under the reaction conditions, e.g. a lower alcohol such as ethanol, or a lower carboxylic acid such as acetic acid.

The production of the compounds used as starting materials in the processes of the invention will now be described.

The (4aRS,5SR,9bSR) or (4aRS,5SR,9bRS) compounds of formula I*e*, used as starting materials in process (d), may be obtained a'. by acylating a (4aRS,5SR,9bSR) or (4aRS,5SR,9bRS) compound, respectively, of formula I*a* with a reactive acid derivative, e.g. an acid halide or acid anhydride of formula V,

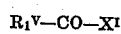
    V or of formula VI,

R₁—CO—O—CO—R₁    VI in which R₁ᵥ signifies a lower alkyl radical, R₁ has the above significance, and X' signifies chlorine or bromine, in the presence of a basic condensation agent, or b'. by reacting a (4aRS,5SR,9bSR) or 4aRS,5SR,9bRS) compound of formula I*f* with a chloroformic acid ester of formula IV to produce a (4aRS,5SR,9bSR) or (4aRS,5SR,9bRS) compound, respectively, of formula I*i*.

The acylation in accordance with process (a') is preferably effected in a solvent which is inert under the reaction conditions, e.g. an aromatic hydrocarbon such as benzene. A tertiary organic base such as triethylamine, or an alkali metal hydroxide such as sodium or potassium hydroxide, or pyridine, may, for example, be used as the basic acid-binding agent, or alternatively the reaction may be effected with an excess of at least one mol of the compound of formula I*a*.

Process (b') may be effected in a manner analogous to that described for process (e).

Some of the starting materials required for process (e) are a special case of the compounds of formula I, i.e. the compounds of formula I*k*,

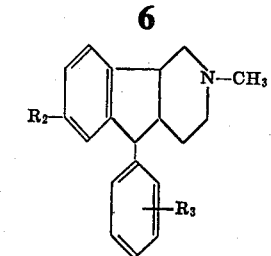

I*k* in which R₂ and R₃ have the above significance.

The (4aRS,5SR,9bSR) or (4aRS,5SR,9bRS) compounds of formula I*g*, used as starting materials in process (f), may, for example, be obtained by reacting a (4aRS,5SR,9bSR) or (4aRS,5SR,9bRS) compound, respectively, of formula I*a* with a compound of formula II*a*,

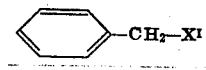

II*a* in which X' has the above significance, in accordance with process (a), or by cyclizing a compound of formula III*e*,

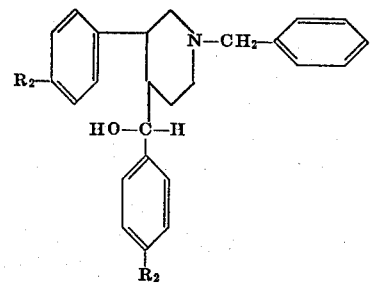

III*e* in which R₂ has the above significance, with polyphosphoric acid in accordance with process (c) to produce a compound of formula I*m*,

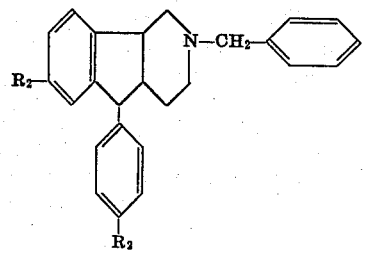

I*m* in which R₂ has the above significance, and isolating the desired (4aRS,5SR,9bSR) or (4aRS,5SR,9bRS) isomer thereof, respectively.

The use of (4aRS,5SR,9bSR) or (4aRS,5SR,9bRS) compounds in processes (a), (d), (e), (f), (a') and (b') yields (4aRS,5SR,9bSR) or (4aRS,5SR,9bRS) compounds, respectively, of formula I, i.e. in these processes the configuration in positions 4a, 5 and 9b remains substantially unchanged.

Processes (b) and (c) yield mixtures of isomers, in which (4aRS,5SR,9bSR) or (4aRS,5SR,9bRS) compounds predominate depending on the substituents.

The (4aRS,5RS,9bRS) compounds may be rearranged to (4aRS,5SR,9bRS) compounds in accordance with process (g) by heating in an alkaline medium, e.g. with alkali metal hydroxides such as 40 percent potassium hydroxide in butanol. For example if process (e) is carried out using (4aRS,5RS,9bRS) compounds as starting materials, then (4aRS,5SR,9bRS) compounds will be produced when the urethane or cyanamide group is hydrolyzed by heating for an extended period with a strong alkali.

The compounds of formulas III*a*, III*b*, III*c*, used as starting materials in process (b), and the compounds of formula III*f*,

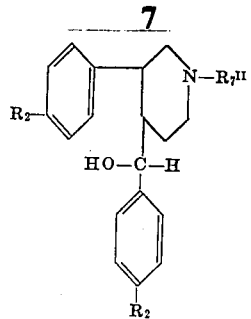

III$_f$ in which R$_7$ signifies hydrogen, lower alkyl, lower alkenyl or benzyl, and R$_2$ has the above significance, which may be employed as starting materials in process (c), may be obtained a''. by reacting a compound of formula VII,

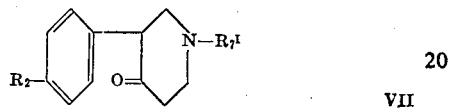

VII in which R$_7^I$ signifies lower alkyl, lower alkenyl, lower alkinyl or benzyl, and R$_2$ has the above significance, with an organometallic compound of formula VIII,

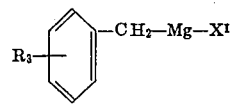

VIII or formula VIIIa,

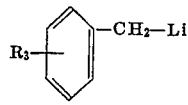

VIIIa in which R$_3$ and X$'$ have the above significance, in a solvent which is inert under the reaction conditions, and hydrolyzing the resulting complex to produce a compound of formula IIIg,

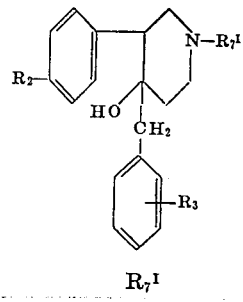

IIIg in which R$_2$, R$_3$ and R$_7^I$ have the above significance, or b''. by reacting a compound of formula VII either with a benzyltris-dimethylaminophosphonium halide of formula IX,

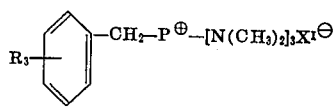

IX in which R$_3$ and X$'$ have the above significance, or with a benzyl-dialkylphosphonate of formula IXa,

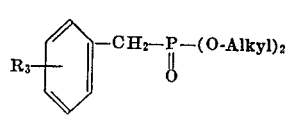

IXa in which R$_3$ has the above significance, in a solvent which is inert under the reaction conditions and in the presence of an alkali metal alcoholate or an alkali metal amide, to produce a compound of formula III$h$,

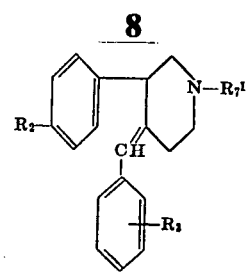

IIIh in which R$_7'$, R$_2$ and R$_3$ have the above significance, or c''. by removing water from a compound of formula IIIa or IIId to produce either a compound of formula IIIc or IIIb, depending on the reaction conditions, or d''. by reducing a compound of formula IIIk,

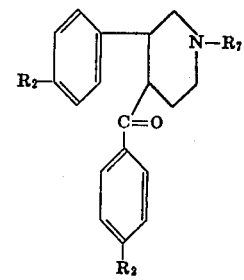

IIIk in which R$_7$ signifies hydrogen, lower alkyl, lower alkenyl, lower alkinyl or benzyl, and R$_2$ has the above significance, with a complex metal hydride, to produce a compound of formula IIIi,

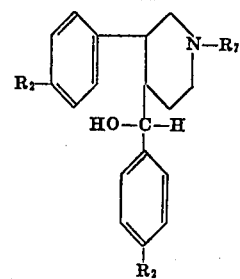

IIIl in which R$_2$ and R$_7$ have the above significance, or e''. by removing the methyl or benzyl radical from a compound of formula IIIp, IIIq or IIIr,

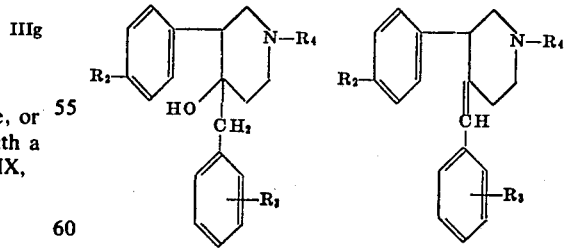

III$_p$  III$_q$

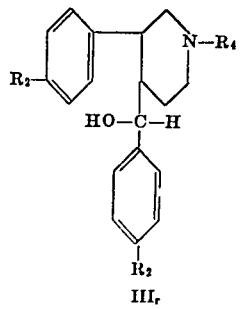

III$_r$ in which $R_2$, $R_3$ and $R_4$ have the above significance, to produce, respectively, a compound of formula IIIm, IIIn or IIIo,

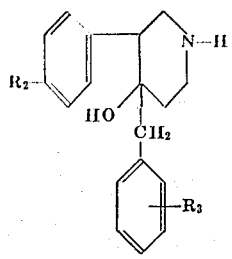
IIIm

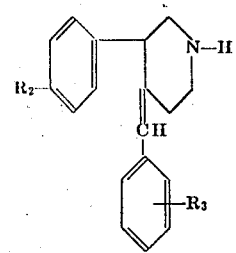
IIIn

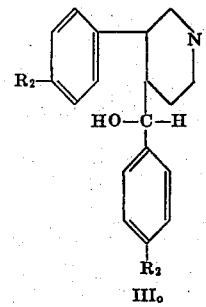
IIIo in which $R_2$ and $R_3$ have the above significance.

Cyclic or open chain ethers, such as diethyl ether or tetrahydrofuran, may, for example, be used as solvents which are inert under the reaction conditions for the reaction of a compound of formula VII with a compound of formula VIII or VIIIa in accordance with process (a''), and the reaction is preferably effected at a temperature between 20° and 70° C. Benzyl magnesium bromide or benzyl lithium may, for example, be used as the organometallic compound of formula VIII or VIIIa.

Aromatic hydrocarbons such as toluene, or cyclic or open chain ethers such as tetrahydrofuran, or di(lower)alkyl-carboxylic acid amides such as N,N-dimethyl formamide, or mixtures thereof may, for example, be used as solvents which are inert under the reaction conditions in process (b'') for the production of compounds of formula IIIh. The reaction is effected in the presence of an alkali metal alcoholate, e.g. sodium ethylate or potassium tert.butylate, or an alkali metal amide, e.g. sodium amide.

Hydrochloric acid, hydrochloric acid/acetic acid, sulphuric acid, methanesulphonic acid or phosphoric acid may, for example, be used as water-removing agent in process (c''), and the reaction is preferably effected at a temperature between 40° and 120° C and for a period of about 1 to 48 hours.

The production of compounds of formula IIIi in accordance with process (d'') is effected using complex metal hydrides as reducing agents, for example lithium aluminum hydride, in which case cyclic ethers which are inert under the reaction conditions, such as tetrahydrofuran or dioxane, may be used as solvents, or sodium borohydride, in which case lower alcohols or mixtures of lower alcohols with water, such as ethanol or ethanol/water, may, for example, be used as solvents.

The removal of the methyl or benzyl radical in accordance with process (e'') may be effected in a manner analogous to that described in process (e).

The compounds of formula IIIe are a special case of the compounds of formula IIIr.

The compounds of formula VII, used as starting materials, may be produced by reacting an atropic acid ester appropriately substituted on the phenyl radical with a 3-aminopropionic acid ester appropriately substituted on the nitrogen atom, cyclizing the addition product by treatment with a basic condensation agent and hydrolyzing and decarboxylating the resulting compound.

The compounds of formulas IIIp, IIIq and IIIr are special cases of the compounds of formulas IIIg, IIIh and IIIi.

(4aRS,5RS,9bRS) compounds of formula I are used as starting materials in process (g). For example, (4aRS,5RS,9bRS) compounds of formula XI,

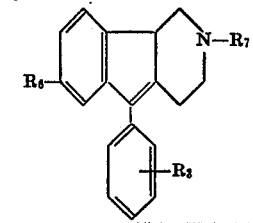
XI in which $R_3$ has the above significance, and $R_6$ signifies hydrogen, chlorine, bromine, fluorine or lower alkyl, may be used as intermediates for the production of (4aRS,5RS,9bRS) compounds of formula Ia in accordance with process (e), (4aRS,5SR,9bRS) compounds being produced in accordance with process (g). These compounds may be obtained by reducing a compound of formula XII,

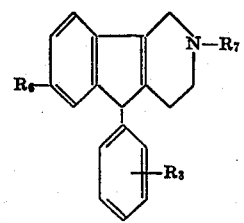
XII or of formula XIIa

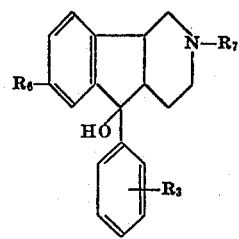
XIIa in which $R_3$, $R_6$ and $R_7$ have the above significance, or mixtures thereof, or a compound of formula XIII,

XIII in which $R_3$, $R_6$ and $R_7$ have the above significance, or by reacting a compound of formula XIa,

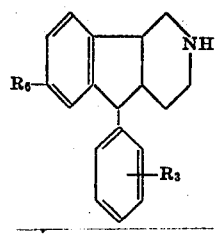
XIa in which $R_3$ and $R_6$ have the above significance, with a compound of formula IIc, $R_7$—X    IIc.

in which X has the above significance, and $R_7$ signifies lower alkinyl.

Compounds of formula XII may be obtained by reacting an isonicotinic acid ester of formula XIV

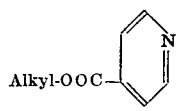

XIV with a compound of formula IIb, $$R_7^I - X^I \quad \text{IIb}$$

in which $R_7^I$ and $X^I$ have the above significance, to give a 1-$R_7^I$-pyridinium halide of formula XV,

XV in which $R_7^I$ and $X^I$ have the above significance, e.g. by heating the components for several hours in a solvent which is inert under the reaction conditions, e.g. a lower alcohol such as ethanol. The tetrahydroisonicotinic acid esters of formula XVI,

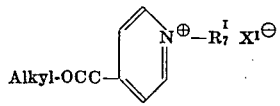

XVI in which $R_7^I$ has the above significance, are obtained from the compounds of formula XV by reduction, e.g. with sodium borohydride. These tetrahydroisonicotinic acid esters are reacted with a magnesium compound of formula VIIIb,

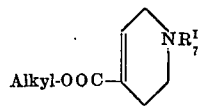

VIIIb in which $R_6$ and $X^I$ have the above significance. Hydrolysis of the resulting products yields compounds of formula XVII,

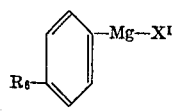

XVII in which $R_7^I$ and $R_6$ have the above significance. These compounds are converted into compounds of formula XVIIIa,

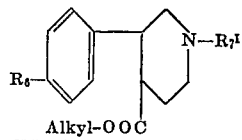

XVIIIa in which $R_7^I$ and $R_6$ have the above significance, either directly by heating with polyphosphoric acid or by hydrolysis to the free carboxylic acid, production of the acid chloride, e.g. with thionyl chloride, and cyclization with a Friedel-Crafts catalyst, e.g. anhydrous aluminum chloride.

Ketones of formula XVIIIb,

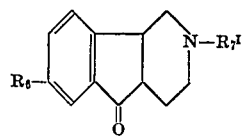

XVIIIb in which $R_6$ has the above significance, may be obtained from a ketone of formula XVIIIc,

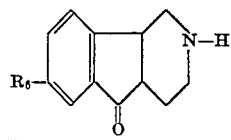

XVIIIc in which $R_6$ has the above significance, in a manner analogous to that described in process (e).

Ketones of formula XVIII,

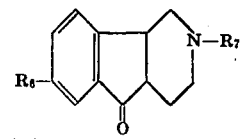

XVIII in which $R_6$ and $R_7$ have the above significance, are converted into compounds of formula XIII by reaction with an organometallic compound of formula VIIIc,

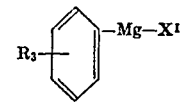

VIIIc in which $R_3$ and $X^I$ have the above significance, and subsequent hydrolysis of the complexes. Water may then be removed from the hydroxy compounds of formula XIII, e.g. by treating with strong acids or acid halides, whereby compounds of formulas XII and XIIa or mixtures thereof are obtained.

The compounds of formula IIIk used as starting materials for the production of compounds IIIi in accordance with process (d") indicated above may be obtained a'''. by reacting a compound of formula XVI with at least two mols of a Grignard compound of formula VIIId,

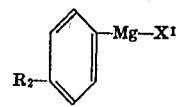

VIIId in which $R_2$ and $X^I$ have the above significance, in a solvent which is inert under the reaction conditions, and hydrolyzing the reaction product to produce a compound of formula IIIu,

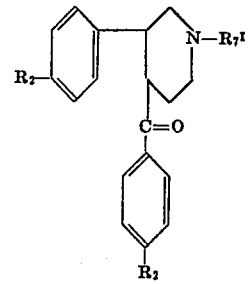

IIIu in which $R_2$ and $R_7^I$ have the above significance, or b'''. by removing the methyl radical from compounds of formula IIIt,

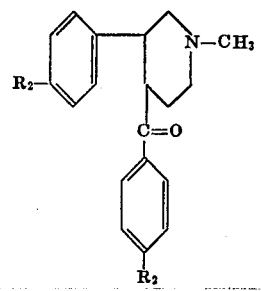

IIIt in which $R_2$ has the above significance, and which are a special case of the compounds of formula IIIu, to produce compounds of formula IIIs,

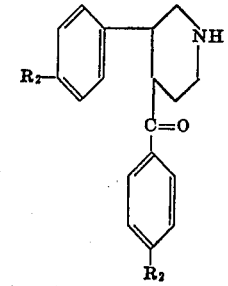

IIIs in which $R_2$ has the above significance. The removal of the methyl radical may be effected in a manner analogous to that described in process (e).

The lower alkyl radicals represented by the symbol $R_1$ preferably contain one to four, especially one to three carbon atoms. The lower alkenyl or alkinyl radicals represented by the symbol $R_1$ preferably contain three to six, especially three to five carbon atoms. The lower alkyl or alkoxy and alkylthio radicals represented by the symbols $R_2$ and $R_3$ preferably contain one to four, especially one to two carbon atoms.

The acid addition salts may be produced in manner known per se from the bases of formula I and vice versa.

Insofar as the production of the starting materials is not described, these are known or may be produced in accordance with processes known per se or in a manner analogous to the processes described herein or to known processes.

The (4aRS,5SR,9bSR) and (4aRS,5SR,9bRS) compounds of the invention are useful because they possess pharmacological activity in animals. More particularly, the compounds are serotonin-antagonists, as indicated by the serotonin toxicity test in guinea pigs, the serotonin paw edema test in rats and the influence on the pressoric serotonin blood pressure reaction in dogs.

For the above-mentioned use, the dose naturally varies depending on the compound employed, the mode of administration, and the treatment desired. However, in general, satisfactory results are obtained in test animals at doses from about 0.5 to 30 mg/kg animal body weight. For larger mammals an indicated suitable daily dose amounts to about 1 to 30 mg, which may be administered orally in divided units containing about 0.3 to 15 mg of a compound of formula I, aside from solid or liquid carriers or diluents, two or three times daily, or in retard form.

(4aRS,5SR,9bSR) and (4aRS,5SR,9bRS) compounds of formula Ib are also analgesics as indicated by the hot plate test and by an inhibition of the phenyl-benzoquinone syndrome in mice. Doses will naturally vary depending on the compound employed, the mode of administration, and the condition to be treated. However, satisfactory results are observed in test animals at doses between about 3 and 30 mg/kg animal body weight. For larger mammals an indicated suitable daily dose amounts to about 10 to 100 mg, which may be administered in divided units containing about 3 to 50 mg of a compound of formula Ib, aside from solid or liquid carriers or diluents, two or three times daily, or in retard form.

Furthermore (4aRS,5SR,9bSR) and (4aRS,5SR,9bRS) compounds of formula Ia are antiphlogistics as indicated by the carrageen edema and traumatic edema tests in rats. Doses will naturally vary depending on the compound employed, the mode of administration and the condition to be treated. However, satisfactory results are observed in test animals at doses between about 1 and 30 mg/kg animal body weight. For larger mammals an indicated suitable daily dose amounts to about 30 to 10 mg, which may be administered in divided units containing about 10 to 50 mg of a compound of formula Ia, aside from solid or liquid carriers or diluents, two or three times daily, or in retard form.

The (4aRS,5SR,9bSR) and (4aRS,5SR,9bRS) compounds of formulas I, Ia and Ib may be used in free base form or in the form of a physiologically acceptable acid addition salt. The salt forms have the same order of activity as the free base forms.

In the following non-limitative Examples all temperatures are indicated in degrees Centigrade and are uncorrected.

EXAMPLE 1:

(4aRS,5SR,9bSR)-7-chloro-5-p-chlorophenyl-1,3,4,4a,5,9b-hexahydro-2-methyl-2H-indeno[1,2-c]pyridine.

100 g. of 4-(p-chloro-α-hydroxybenzyl)-3-p-chlorophenyl-1-methyl piperidine are added portionwise during the course of 15 minutes to 800 g of polyphosphoric acid preheated to 110°. The reaction mixture is stirred at the same temperature for 8 hours and is then poured on a mixture of 3 kg of ice and 1,500 cc of methylene chloride while stirring. The mixture is subsequently made neutral with a concentrated caustic soda solution, the organic phase is separated and the aqueous phase is again shaken out thrice with 1,000 cc amounts of methylene chloride. The organic extracts are washed with water, dried over sodium sulphate, and the solvent is removed by distillation at reduced pressure. The oily residue is distilled in a high vacuum, whereby the primary fraction distills as an oil at 195°–200°/0.01 mm of Hg.

The portion obtained in crystalline form from acetonitrile is a mixture of isomers having a M.P. of 95°–110°. A fumarate, having a M.P. of 224°–225°, is obtained from this mixture of isomers with fumaric acid in ethanol; this salt is divided between diethyl ether and a 2 N caustic soda solution, the ether phase is dried over magnesium sulphate and the solvent is removed, whereby the title compound, having a M.P. of 112°–114° after recrystallization from n-hexane, is obtained.

EXAMPLE 2:

(4aRS,5SR,9bRS)-7-chloro-5-p-chlorophenyl-1,3,4,4a,5,9b-hexahydro-2-methyl-2H-indeno[1,2-c]pyridine.

The title compound is produced in a manner analogous to that described in Example 1. After separating the fumarate the mother liquor of the fumarate is completely concentrated at reduced pressure and the residue is divided between diethyl ether and a 2 N caustic soda solution. After drying and concentrating the ether phase the residue is recrystallized from n-hexane, whereby (4aRS,5SR,9bRS)-7-chloro-5-p-chlorophenyl-1,3,4,4a,5,9b-hexahydro-2-methyl-2H-indeno-[1,2-c]pyridine, having a M.P. of 122°–125°, is obtained.

EXAMPLE 3:

(4aRS,5SR,9bSR)-2,7-dimethyl-1,3,4,4a,5,9b-hexahydro-5-p-tolyl-2-H-indeno[1,2-c]pyridine.

35 g of 4-(α-hydroxy-p-methylbenzyl)-1-methyl-3-p-tolyl-piperidine are added during the course of 5 minutes to 280 g of polyphosphoric acid preheated to 100°. The reaction mixture is stirred at 130° for 30 minutes and is subsequently poured on 200 g of ice. The mixture is subsequently made alkaline with a 5 N caustic soda solution and is shaken out thrice with 400 cc of diethyl ether. After washing with water and drying over magnesium sulphate the solvent is removed by distillation and the oily residue is distilled in a high vacuum. The title compound distils over at 165°–170°/0.1 mm of Hg. The compound obtained in crystalline form from acetonitrile has a M.P. of 106°–107°.

EXAMPLE 4:

(4aRS,5SR,9bRS)-7-fluoro-5-p-fluorophenyl-1,3,4,4a,5,9b-hexahydro-2-methyl-2H-indeno[1,2-c]pyridine.

A mixture of the (4aRS,5SR,9bRS) and (4aRS,5SR,9bSR) isomers is obtained from 4-(p-fluoro-α-hydroxybenzyl)-3-p-fluorophenyl-1-methyl piperidine in a manner analogous to that described in Example 1 and has a B.P. of 155°/0.01 mm of Hg after distillation in a high vacuum.

The isomer of the heading is isolated as follows: 26.3 g of the mixture obtained above are dissolved with 13.8 g of benzenesulphonic acid in 78 cc of ethanol and 78 cc of ether are added to the solution, whereby a benzene sulphonate, having a M.P. of 110°–120°, crystallizes. This is divided between ether and N caustic soda solution, the ether extract is washed with water, dried over magnesium sulphate and completely concentrated. The oily residue is taken up in n-hexane and after cooling the title compound crystallizes as pure isomer. M.P. 103°–105°.

EXAMPLE 5:

(4aRS,5SR,9bSR)-7-fluoro-5-p-fluorophenyl-1,3,4,4a,5,9b-hexahydro-2-methyl-2H-indeno[1,2-c]pyridine.

The title compound is produced in a manner analogous to that described in Example 4. After separating the benzene sulphonate having a M.P. of 110°–120°, the filtrate is completely concentrated at reduced pressure. The oily residue is divided between ether and N caustic soda solution, the ether extract is dried over magnesium sulphate and completely concentrated. The oily residue, 14 g of base, is dissolved with 4.5 g of maleic acid in 35 cc of ethanol, and after cooling a hydrogen maleate, having a M.P. of 163°–185°, crystallizes. This is divided between chloroform and N caustic soda solution, the chlorofrom extract is dried over magnesium sulphate and concentrated at reduced pressure. The oily residue is taken up in 90 percent alcohol, and after cooling the title compound crystallizes in isomer-free form. M.P. 120°.

EXAMPLE 6:

(4aRS,5SR,9bSR)-2-ethyl-1,3,4,4a,5,9b-hexahydro-7-methyl-5-p-tolyl-2H-indeno[1,2-c]pyridine.

A solution of 2.2 g of ethyl bromide in 20 cc of dimethyl formamide is added dropwise at room temperature to a suspension of 5.6 g of (4aRS,5SR,9bSR)-1,3,4,4a,5,9b-hexahydro-7-methyl-5-p-tolyl-2H-indeno[1,2-c]pyridine and 4.3 g of sodium carbonate in 40 cc of dimethyl formamide. The reaction mixture is subsequently heated in an oil bath of 130° for 90 minutes, is then allowed to cool to room temperature and is poured on 200 cc of a common salt solution. The aqueous phase is shaken out thrice with 100 cc amounts of diethyl ether, the ether extract is dried over magnesium sulphate, purified with animal charcoal and completely concentrated at reduced pressure. The crystalline residue is dissolved in acetonitrile with heating, whereby the title compound crystallizes upon cooling. M.P. 97°–99°.

The following compounds of formula I (Examples 7 to 15) may be obtained in a manner analogous to that described in Example 6:

| Ex. | R₁ | R₂ | R₃ | Configuration | Phys. chem. constants |
| --- | --- | --- | --- | --- | --- |
| 7 | isopropyl | methyl | 4-methyl | 4aRS, 5SR,9bSR | M.P. 94–95° |
| 8 | allyl | methyl | 4-methyl | 4aRS, 5SR,9bSR | M.P. 103–105° |
| 9 | 2-propinyl | methyl | 4-methyl | 4aRS, 5SR,9bSR | M.P. 153–155° |
| 10 | isopropyl | chloro | 4-chloro | 4aRS, 5SR,9bSR | M.P. of the mesylate 250–254° |
| 11 | ethyl | chloro | 4-chloro | 4aRS, 5SR,9bRS | M.P. 75–77° |
| 12 | n-propyl | chloro | 4-chloro | 4aRS, 5SR,9bRS | M.P. of the hydrogen sulphate 218–222° |
| 13 | isopropyl | chloro | 4-chloro | 4aRS, 5SR,9bRS | M.P. 116–118° |
| 14 | allyl | chloro | 4-chloro | 4aRS, 5SR,9bRS | M.P. 83–84° |
| 15 | ethyl | methyl | 4-methyl | 4aRS, 5SR,9bRS | M.P. of the hydrogen chloride 265° (decomp.) |

EXAMPLE 16:

(4aRS,5SR,9bRS)-1,3,4,4a,5,9b-hexahydro-2,7-dimethyl-5-phenyl-2H-indeno[1,2-c]pyridine.

A mixture of 9 g of (4aRS, 5RS,9bRS)-1,3,4,4a,5,9b-hexahydro-2,7-dimethyl-5-phenyl-2H-indeno[1,2-c]pyridine hydrochloride and 36 g of potassium hydroxide in 90 cc of n-butanol is heated in an oil bath of 150° for 24 hours. After cooling to room temperature the mixture is diluted with water and shaken out with diethyl ether. The ether extract is purified over animal charcoal, dried over magnesium sulphate, completely concentrated at reduced pressure, and the oily residue, the title compound, is converted into the hydrochloride with hydrochloric acid in ethanol. M.P. 250°–280° (decomp.).

The following compounds of formula I (Examples 17 to 20) may be obtained in a manner analogous to that described in Example 16:

| Ex. | R₁ | R₂ | R₃ | Configuration | Phys. chem. constants |
| --- | --- | --- | --- | --- | --- |
| 17 | methyl | methyl | 3-methyl | 4aRS, 5SR, 9bRS | M.P. of the hydrochloride 280° (decomp.) |
| 18 | methyl | methyl | 4-methyl | 4aRS, 5SR, 9bRS | M.P. of the hydrochloride 305–309° (decomp.) |
| 19 | methyl | methyl | 4-methoxy | 4aRS, 5SR, 9bRS | M.P. of the hydrochloride 295° (decomp.) |
| 20 | hydrogen | hydrogen | hydrogen | 4aRS, 5SR, 9bRS | M.P. of the hydrochloride 287–289° (decomp.) |

EXAMPLE 21:

(4aRS,5SR,9bSR)-7-chloro-5-p-chlorophenyl-1,3,4,4a,5,9b-hexahydro-2-methyl-2H-indeno[1,2-c]pyridine.

4 g of 4-p-chlorobenzylidene-3-p-chlorophenyl-1-methyl piperidine are heated in 35 g of polyphosphoric acid in an oil bath of 110° for 4 hours. Working up of the reaction mixture is effected in a manner analogous to that described in Example 1. M.P. 112°–114° from n-hexane.

EXAMPLE 22:

(4aRS,5SR,9bRS)-7-chloro-5-p-chlorophenyl-1,3,4,4a,5,9b-hexahydro-2-methyl-2H-indeno[1,2-c]pyridine.

4 g of 4-p-chlorobenzylidene-3-p-chlorophenyl-1-methyl piperidine are heated in 35 g of polyphosphoric acid in an oil bath of 110° for 4 hours. Working up of the reaction mixture is effected in a manner analogous to that described in Example 2. M.P. 122°–124° from n-hexane.

EXAMPLE 23:

(4aRS,5SR,9bRS)-2-ethyl-7-chloro-5-p-chlorophenyl-1,3,4,4a,5,9b-hexahydro-2H-indeno[1,2-c]pyridine.

A solution of 2.54 g of (4aRS,5SR,9bRS)-2-acetyl-7-chloro-5-p-chlorophenyl-1,3,4,4a,5,9b-hexahydro-2H-indeno[1,2-c]pyridine in 25 cc of absolute ether is added dropwise at 0° to 0.55 g of lithium aluminum hydride in 25 cc of absolute ether. After stirring the reaction mixture at 0° for 1 hour and 45 minutes, and at room temperature for 2 ½ hours, it is cooled to −10° and 5 cc of a 20 percent caustic soda solution are added dropwise during the course of 5 minutes. The ether phase is separated, dried over magnesium sulphate and completely concentrated. The oily residue is taken up in n-hexane and after cooling the title compound crystallizes. M.P. 75°–77.

EXAMPLE 24:

(4aRS,5SR,9bRS)-7-chloro-5-p-chlorophenyl-1,3,4,4a,5,9b-hexahydro-2-methyl-2H-indeno[1,2-c]pyridine.

0.63 cc of sulphuric acid monohydrate are added dropwise at −10° to 2.35 g of lithium aluminum hydride in 70 cc of absolute tetrahydrofuran. The mixture is then stirred at room temperature for 1 hour, is again cooled to −10° to 0° and a solution of 5.1 g of (4aRS,5SR,9bRS)-7-chloro-5-p-chlorophenyl-1,3,4,4a,5,9b-hexahydro-2(2H)-indeno[1,2-c]pyridine carboxylic acid ethyl ester in 30 cc of absolute tetrahydrofuran is added dropwise. The mixture is subsequently stirred at 0° for 50 minutes, 10 cc of a saturated sodium sulphate solution are then added dropwise while cooling and the solution is diluted with a small amount of tetrahydrofuran. The mixture is filtered, the filtrate is completely concentrated and the oily residue is recrystallized once from n-hexane and then from ethanol, whereby the title compound, having a M.P. of 122°–125°, is obtained.

EXAMPLE 25:

(4aRS,5SR,9bSR)-1,3,4,4a,5,9b-hexahydro-5-phenyl-2H-indeno[1,2-c]pyridine.

A solution of 43 g of chloroformic acid ethyl ester in 80 cc of absolute benzene is added dropwise at room temperature during the course of half an hour to a solution of 30 g of (4aRS,5SR,9bSR)-1,3,4,4a,5,9b-hexahydro-2-methyl-5-phenyl-2H-indeno[1,2-c]pyridine in 300 cc of absolute benzene. The reaction mixture is then heated to the boil at reflux for 3 hours, is cooled to 20°, washed with 2 N hydrochloric acid and water, and dried over sodium sulphate. After concentrating the solution by evaporation at reduced pressure the residue is dried at 90° for 3 hours and is dissolved in 300 cc of n-butyl alcohol, 120 g of potassium hydroxide are added, and the mixture is stirred at 130° for 1 ½ hours. The reaction mixture is cooled to 20°, diluted with 600 cc of toluene, washed with water until neutral and extracted with 2 N tartaric acid. The aqueous acid extracts are made alkaline with potassium carbonate while cooling, whereupon they are extracted with methylene chloride. The organic extracts are washed with water and dried over potassium carbonate. After evaporating the solvent at reduced pressure, the residue is dissolved in 200 cc of methanol, the pH of the resulting solution is adjusted to 3 with a solution of hydrogen chloride in ethanol, the acid solution is filtered over active charcoal and is concentrated to about 50 cc. The hydrochloride of the title compound which crystallizes is recrystallized from ethanol. M.P. 292°–294°.

The following compounds of formula I (Examples 26 to 29) may be obtained in a manner analogous to that described in Example 25:

| Ex. | R₁ | R₂ | R₃ | Configuration | Phys. chem. constants |
| --- | --- | --- | --- | --- | --- |
| 26 | hydrogen | methyl | 4-methyl | 4aRS, 5SR, 9bSR | M.P. 45–46° |
| 27 | hydrogen | chloro | 4-chloro | 4aRS, 5SR, 9bSR | B.P. 210°/0.06 mm Hg |
| 28 | hydrogen | chloro | 4-chloro | 4aRS, 5SR, 9bRS | B.P. 175–180°/0.01 mm Hg |
| 29 | hydrogen | methyl | 4-methyl | 4aRS, 5SR, 9bRS | M.P. of the hydrogen fumarate 210–213° |

EXAMPLE 30:

(4aRS,5SR,9bSR)-1,3,4,4a,5,9b-hexahydro-5-phenyl-2H-indeno[1,2-c]pyridine.

A solution of 5 g of (4aRS,5SR,9bSR)-2-benzyl-1,3,4,4a,5,9b-hexahydro-5-phenyl-2H-indeno[1,2-c]pyridine in 60 cc of ethanol is hydrogenated in the presence of 0.2 g of 10 percent palladium charcoal at normal pressure and room temperature. After the theoretic amount of hydrogen is taken up, the solution is filtered and the filtrate is evaporated to dryness at reduced pressure. (4aRS,5SR,9bSR)-1,3,4,4a,5,9b-hexahydro-5-phenyl-2H-indeno[1,2-c]-pyridine is obtained from the residue in a manner analogous to that described in Example 25. M.P. 292°–294°.

EXAMPLE 31:

(4aRS,5SR,9bRS)-7-chloro-5-p-chlorophenyl-1,3,4,4a,5,9b-hexahydro-2H-indeno[1,2-c]pyridine.

A solution of 2 g of (4aRS,5SR,9bRS)-2-benzyl-7-chloro-5-p-chlorophenyl-1,3,4,4a,5,9b-hexahydro-2H-indeno[1,2-c]pyridine hydrochloride in 50 cc of glacial acetic acid is hydrogenated with 0.2 g of 5 percent palladium on active charcoal at 50° and 5 atmospheres for 7 hours. The mixture is subsequently filtered, the filtrate is completely concentrated at reduced pressure and the oily residue is divided between diethyl ether and a 2 N caustic soda solution. After washing the ether extract with water and drying over magnesium sulphate the solvent is completely removed by distillation and 10 cc of a 2.1 N solution of hydrochloric acid in ethanol are added to the residue. After the addition of a small amount of ether and cooling in an ice bath the title compound crystallizes as hydrochloride. M.P. 245°–250°.

EXAMPLE 32:

(4aRS,5SR,9bRS)-1,3,4,4a,5,9b-hexahydro-5-phenyl-2H-indeno[1,2-c]pyridine.

10 g of crude (4aRS,5RS,9bRS)-2-ethoxycarbonyl-1,3,4,4a,5,9b-hexahydro-5-phenyl-2H-indeno[1,2-c]pyridine are boiled at reflux with a solution of 80 g of potassium hydroxide in 200 cc of butanol for 24 hours. Working up is effected in a manner analogous to that described in Example 16, whereby (4aRS,5SR,9bRS)-1,3,4,4a,5,9b-hexahydro-5-phenyl-2H-indeno[1,2-c]pyridine hydrochloride, having a M.P. of 287°–289°(descomp.), (decomp.), is obtained.

EXAMPLE 33:

(4aRS,5SR,9bRS)-1,3,4,4a,5,9b-hexahydro-5-phenyl-2H-indeno[1,2-c]pyridine.

A solution of 12 g of (4aRS,5SR,9bRS)-1,3,4,4a,5,9b-hexahydro-2-methyl-5-phenyl-2H-indeno[1,2-c]pyridine in 120 cc of absolute benzene is added dropwise at 70°–75° during the course of half an hour to a solution of 15 g of chloroformic acid ethyl ester in 60 cc of benzene. The mixture is boiled at reflux for 2 ½ hours, is cooled, a small amount of precipitated (4aRS,5SR,9bRS)-1,3,4,4a,5,9b-hexahydro-2-methyl-5-phenyl-2H-indeno[1,2-c]pyridine hydrochloride is filtered off and the filtrate is concentrated by evaporation. The resulting crude (4aRS,5SR,9bRS)-2-ethoxycarbonyl-1,3,4,4a,5,9b-hexahydro-5-phenyl-2H-indeno[1,2-c]pyridine is boiled at reflux with a mixture of 75 cc of glacial acetic acid and 75 cc of concentrated hydrochloric acid for 16 hours. The mixture is evaporated to dryness in a vacuum, the residue is dissolved in a small amount of isopropanol and ether is added, whereupon the hydrochloride of the title compound crystallizes. This is recrystallized from isopropanol/ether and has a M.P. of 287°–289° (decomp.).

The required starting materials may be obtained as follows:

EXAMPLE 34:

(4aRS,5RS,9bRS)-7-chloro-1,3,4,4a,5,9b-hexahydro-2-methyl-5-phenyl-2H-indeno[1,2-c]pyridine.

A solution of 11.8 g of 7-chloro-1,3,4,9-tetrahydro-2-methyl-5-phenyl-2H-indeno[1,2-c]pyridine (M.P. 120°–123°) in 120 cc of glacial acetic acid is hydrogenated with 0.6 g of platinum oxide at 40° and 4 atmospheres for 36 hours. The catalyst is filtered off from the reaction mixture and the filtrate is completely concentrated at reduced pressure. The residue is taken up in 100 cc of water, is made alkaline with a 5 N caustic soda solution while cooling and is shaken out thrice with 150 cc amount of diethyl ether. The combined ether extracts are washed with water until neutral, are dried over magnesium sulphate, and the solvent is completely removed by distillation. The oily residue is dissolved in 40 cc of ethanol and the calculated amount of hydrochloric acid in ethanol is added, whereby the title compound is obtained as hydrochloride. M.P. 284° (decomp.).

The following compounds (Examples 35 to 39) may be obtained in a manner analogous to that described in Example 34:

| Ex. | R₁ | R₂ | R₃ | Configuration | Chem.phys. constants | For Ex. |
|---|---|---|---|---|---|---|
| 35 | methyl | methyl | hydrogen | 4aRS, 5RS, 9bRS | M.P. of the hydrochloride 250–260° (decomp.) | 16 |
| 36 | methyl | methyl | 3-methyl | 4aRS, 5RS, 9bRS | M.P. of the hydrochloride 230° (decomp.) | 17 |
| 37 | methyl | methyl | 4-methyl | 4aRS, 5RS, 9bRS | M.P. of the hydrochloride 252° (decomp.) | 18 |
| 38 | methyl | methyl | 4-methoxy | 4aRS, 5RS, 9bRS | M.P. 120–121° | 19 |
| 39 | hydrogen | hydrogen | hydrogen | 4aRS, 5RS, 9bRS | M.P. of the hydrochloride 230–232° (decomp.) | 20 |

EXAMPLE 40:

(4aRS,5RS,9bRS)-1,3,4,4a,5,9b-hexahydro-5-phenyl-2H-indeno[1,2-c]pyridine (for Example 20)

3.6 g of sodium are added in small portions at −35° during the course of 1 hour to a solution of 5.0 g of (4aRS,5SR,9bSR)-1,3,4,4a,5,9b-hexahydro-5-phenyl-5(2H)-indeno[1,2-c]pyridinol in 70 cc of ether and 150 cc of liquid ammonia. The reaction mixture is then stirred without cooling for a further 4 hours, ice is added, the ether layer is separated, washed with sodium chloride solution and concentrated by evaporation after drying over magnesium sulphate. The resulting oil is distilled in a bulb tube at a bath temperature of 150° and at 0.05 mm of Hg. The almost colorless, viscous distillate is a mixture of isomers of (4aRS,5RS,9bRS)-1,3,4,4a,5,9b-hexahydro-5-phenyl-2H-indeno[1,2-c]pyridine and (4aRS,5S R,9bRS)-1,3,4,4a,5,9b-hexahydro-5-phenyl-2H-indeno[1,2-c]pyridine. The relationship of the isomers in accordance with the nuclear magnetic resonance spectrum and the gas chromatogram is 7:3.

EXAMPLE 41:

(4aRS,5RS,9bRS)-1,3,4,4a,5,9b-hexahydro-5-phenyl-2H-indeno[1,2-c]pyridine (for Example 20)

A solution of 12 g of (4aRS,5RS,9bRS)-1,3,4,4a,5,9b-hexahydro-2-methyl-5-phenyl-2H-indeno[1,2-c]pyridine in 120 cc of absolute benzene is added dropwise at 70°–75° during the course of half an hour to a solution of 15 g of chloroformic acid ethyl ester in 60 cc of benzene. The mixture is then boiled at reflux for 2 ½ hours, is cooled, a small amount of precipitated (4aRS,5RS,9bRS)-1,3,4,4a,5,9b-hexahydro-2-methyl-5-phenyl-2H-indeno[1,2-c]pyridine hydrochloride is removed by filtration and the filtrate is concentrated by evaporation. The resulting oily, crude (4aRS,5RS,9bRS)-2-ethoxycarbonyl-1,3,4,4a,5,9b-hexahydro-5-phenyl-2H-indeno[1,2-c]-pyridine is boiled at reflux for 16 hours with a mixture of 75 cc of glacial acetic acid and 75 cc of concentrated hydrochloric acid. The reaction mixture is evaporated to dryness in a vacuum, the residue is dissolved in a small amount of isopropanol and ether is added, whereupon the hydrochloride of the title compound crystallizes. This is recrystallized from isopropanol/ether and has a M.P. of 230°–232° (decomp.).

EXAMPLE 42:

4-(p-chloro-α-hydroxybenzyl)-3-p-chlorophenyl-1-methyl piperidine (for Examples 1 and 2)

a. 73 g of magnesium are covered with a layer of absolute tetrahydrofuran and a few crystals of iodine are added. A solution of 574 g p-chlorobromobenzene in 1,200 cc of absolute tetrahydrofuran is then added dropwise at such a rate that the reaction is kept going. The reaction mixture is then heated at reflux for 1 ½ hours and a solution of 169 g of 1,2,3,6-tetrahydro-1-methyl isonicotinic acid ethyl ester in 500 cc of absolute tetrahydrofuran is added at reflux temperature to the resulting Grignard solution. The reaction mixture is then heated at reflux for an hour and 15 minutes, is cooled to 10° and is poured into a mixture of 420 g of ammonium chloride, 1,000 cc of water, 1,000 g of ice and 1,000 cc of methylene chloride with stirring. The organic phase is separated and the aqueous phase is shaken out thrice with 500 cc amounts of methylene chloride. The combined organic phases are washed with water, dried over magnesium sulphate, and the solvent is removed by distillation at reduced pressure. The oily residue is distilled in a high vacuum, whereby 4-p-chlorobenzoyl-3-p-chlorophenyl-1-methyl piperidine distils over at 220°–230 °/0.06 mm of Hg. The compound obtained in crystalline form from methylene chloride/pentane has a M.P. of 118°–120°.

b. A solution of 22 g of sodium borohydride and 3.5 g of caustic soda in 70 cc of water is added dropwise during the course of 30 minutes to a solution of 104 g of 4-p-chlorobenzoyl-3-p-chlorophenyl-1-methyl piperidine in 700 cc of ethanol at such a rate that the internal temperature does not exceed 40°. The reaction mixture is stirred at 40° for 2 hours and at 70° for 3 hours, and after the dropwise addition of 100 cc of methanol is kept at 70° for a further 30 minutes. The reaction mixture is subsequently evaporated to dryness at reduced pressure and the residue is divided between 1,000 cc of water and 1,000 cc of methylene chloride. The organic phase is separated and the aqueous phase is again shaken out twice with 500 cc amounts of methylene chloride. The combined methylene chloride extracts are dried over magnesium sulphate, the solvent is removed by distillation at reduced pressure and the oily residue, crude 4-(p-chloro-α-hydroxybenzyl)-3-p-chlorophenyl-1-methyl piperidine, is crystallized from acetone. M.P. 140°–142°.

The following compounds (Examples 43 and 44) may be obtained in a manner analogous to that described in Example 42:

| Ex. | $R_1$ | $R_2$ | $R_3$ | Phys. chem. constants | For Example |
|---|---|---|---|---|---|
| 43 | methyl | methyl | 4-methyl | M.P. 120–123° | 3 |
| 44 | methyl | fluoro | 4-fluoro | M.P. 133–135° | 4 and 5 |

The production of the starting material required for Examples 6 to 9 is described in Example 26, for Examples 11 to 14 in Example 28, for Example 10 in Example 27 and for Example 15 in Example 29.

EXAMPLE 45:

1,3,4,9b-tetrahydro-2,7-dimethyl-5-m-tolyl-2H-indeno[1,2-c]pyridine (for Example 36)

a. A solution of 17.1 g of 3-bromotoluene in 100 cc of diethyl ether is added dropwise during the course of 5 minutes and in an atmosphere of nitrogen to 1.39 g of lithium wire cut in small pieces in 100 cc of absolute diethyl ether. The mixture is subsequently heated at reflux for 3 hours, is cooled to −70° and a solution of 10.8 g of 1,3,4,9b-tetrahydro-2,7-dimethyl-2 H-indeno-[1,2-c]pyridin-5(4aH)-one in 100 cc of diethyl ether is added during the course of 15 minutes. The internal temperature is then allowed to rise to 0° and the reaction mixture is poured on 500 g of ice and 500 g of water, the aqueous phase is extracted with 2,000 cc of chloroform, the extract is dried over magnesium sulphate and is almost completely concentrated at reduced pressure. 300 cc of diethyl ether are added, whereby 1,3,4,4a,5,9b-hexahydro- 2,7-dimethyl-5-m-tolyl-5(2H)-ideno[1,2-c]pyridinol crystallizes. M.P. 180°–182°.

b. 50 g of 1,3,4,4a,5,9b-hexahydro-2,7-dimethyl-5-m-tolyl-5(2H)-indeno[1,2-c]pyridinol are heated at reflux for 1 hour in 400 cc of 2.5 N hydrochloric acid in methanol. The solution is then almost completely concentrated at reduced pressure and the crystalline reside, 1,3,4,9b-tetrahydro-2,7-dimethyl-5-m-tolyl-2H-indeno[1,2-c]-pyridine hydrochloride, is recrystallized from alcohol/diethyl ether. M.P. 230°–235°.

The following compounds (Examples 46 and 47) may be obtained in a manner analogous to that described in Example 45:

| Ex. | $R_1$ | $R_2$ | $R_3$ | Phys.chem. constants | For Example |
|---|---|---|---|---|---|
| 46 | methyl | methyl | 4-methyl | M.P. of the hydrochloride 243–245° (decomp.) | 37 |
| 47 | methyl | methyl | 4-methoxy | M.P. of the hydrochloride 232–235° (decomp.) | 38 |

EXAMPLE 48:

(4aRS,5RS,9bRS)-1,3,4,4a,5,9b-hexahydro-2-methyl-5-phenyl-2H-indeno[1,2-c]pyridine (for Example 41)

A solution of 30 g of 1,3,4,9b-tetrahydro-2-methyl-5-phenyl-2H-indeno[1,2-c]pyridine in 200 cc of glacial acetic acid is shaken at 40° for 20 hours with a platinum oxide catalyst and hydrogen at an initial pressure of 6 atmospheres. The catalyst is then filtered off, the solution is evaporated in a vacuum, the residue is divided between a dilute caustic soda solution and methylene chloride, the methylene chloride solution is dried over magnesium sulphate and concentrated by evaporation. The resulting base is dissolved in isopropanol and a solution of hydrogen chloride in ether is added, whereupon (4aRS,5RS,9bRS)-1,3,4,4a,5,9b-hexahydro-2-methyl-5-phenyl-2H-indeno[1,2-c]pyridine hydrochloride crystallizes. After recrystallization from isopropanol the compound has a M.P. of 270°–272° (decomp.).

EXAMPLE 49:

(4aRS,5bRS)-9RS)-1,3,4,4a,5,9b-hexahydro-2-methyl-5-phenyl-2H-indeno[1,2-c]pyridine (for Example 41)

A solution of 20 g of 1,3,4,9b-tetrahydro-2-methyl-5-phenyl-2H-indeno[1,2-c]pyridine and 8.0 g of malonic acid in 100 cc of methanol is boiled at reflux for 2 hours and is then cooled to 0°, whereupon 1,3,4,5-tetrahydro-2-methyl-5-phenyl-2H-indeno[1,2-c]-pyridine hydrogen malonate crystallizes. After crystallization from methanol the compound has a M.P. of 163°–165° (decomp.).

A solution of 10 g of 1,3,4,5-tetrahydro-2-methyl-5-phenyl-2H-indeno[1,2-c]pyridine hydrogen malonate in 100 cc of glacial acetic acid is shaken at normal pressure with 0.5 g of platinum oxide and hydrogen. After the calculated amount of hydrogen has been taken up (about 24 hours) the reaction mixture is further worked up as described in Example 48. (4aRS,59bRS)-1,3,4,4a,5,9b-hexahydro-2-methyl-5-phenyl-2H-indeno[1,2-c]pyridine hydrochloride, having a M.P. of 270°–272° (decomp.), is obtained.

EXAMPLE 50:

(4aRS,5RS,9bRS)-1,3,4,4a,5,9b-hexahydro-2-methyl-5-phenyl-2H-indeno[1,2-c]pyridine (for Example 41)

3.6 g of sodium are added in small portions during the course of 1 hour to a solution of 5.0 g of (4aRS,5SR,9bSR)-1,3,4,4a,5,9b-hexahydro-2-methyl-5-phenyl-5(2H)-indeno[1,2-c]pyridinol in 70 cc of absolute ether and 150 cc of liquid ammonia, whereby the temperature is kept at about −35°. The reaction mixture is then stirred without cooling for a further 3 hours, ice is added, the ether layer is separated, washed with sodium chloride solution and concentrated by evaporation after drying over magnesium sulphate. The resulting oil is a mixture of isomers of the (4aRS,5RS,9bRS) and the (4aRS,5SR,9bRS) compound, whereby the first mentioned compound predominates. This is dissolved in isopropanol and converted into the hydrochloride with hydrogen chloride in ether. After recrystallization from isopropanol pure (4aRS,5R S,9bRS)-1,3,4,4a,5,9b-hexahydro-2-methyl-5-phenyl-2H-indeno[1,2-c]pyridine hydrochloride, having a M.P. of 270°–272° (decomp.), is obtained.

EXAMPLE 51:

4-p-chlorobenzylidene-3-p-chlorophenyl-1-methyl-piperidine (for Examples 21 and 22)

30 g of 4-(p-chloro-α-hydroxybenzyl)-3-p-chlorophenyl-1-methyl piperidine (production see Example 42) in 180 g of 90 percent methanesulphonic acid are heated in an oil bath of 100° for 15 minutes. After cooling to room temperature the reaction mixture is poured on ice, made alkaline with a 5 N caustic soda solution and shaken out thrice with 400 cc amounts of diethyl ether. After drying the ether extract over magnesium sulphate, the solvent is completely removed by distillation and the calculated amount of fumaric acid is added to the oily residue. After cooling the title compound crystallizes as hydrogen fumarate having a M.P. of 190°–191°.

The base used for cyclization is obtained by dividing the hydrogen fumarate between diethyl ether and a 2 N caustic soda solution.

EXAMPLE 52:

(4aRS,5SR,9bRS)-2-acetyl-7-chloro-5-p-chlorophenyl-1,3,4,4a,5,9b-hexahydro-2H-indeno[1,2-c]pyridine (for Example 23)

2.2 g of acetic anhydride are added dropwise while cooling with ice to 6.4 g of (4aRS,5SR,9bRS)-7-chloro-5-p-chlorophenyl-1,3,4,4a,5,9b-hexahydro-2H-indeno[1,2-c]pyridine (production see Example 28) in 40 cc of pyridine. After stirring at room temperature for 1 hour the mixture is completely concentrated at reduced pressure, the residue is taken up in 50 cc of chloroform, washed with 2 N hydrochloric acid and water, dried over magnesium sulphate and completely concentrated by evaporation at reduced pressure. The title compound is obtained as colorless oil.

EXAMPLE 53:

(4aRS,5SR,9bRS)-7-chloro-5-p-chlorophenyl-1,3,4,4a,5,9b-hexahydro-2(2H)-indeno[1,2-c]pyridine carboxylic acid ethyl ester (for Example 24)

A solution of 63.5 g of chloroformic acid ethyl ester in 80 cc of benzene is added dropwise at room temperature during the course of half an hour to a solution of 48.5 g of (4aRS,5SR,9bRS)-7-chloro-5-p-chlorophenyl-1,3,4,4a,5,9b-hexahydro-2-methyl-2H-indeno-[1,2-c]pyridine, having a M.P. of 122°–125° (production see Example 2) in 300 cc of benzene. The reaction mixture is then heated at reflux for 4 hours, is cooled to 20°, washed with 2 N hydrochloric acid and water and the benzene phase is dried over sodium sulphate. After removing the solvent by distillation at reduced pressure the title compound is obtained as colorless

EX. MP (4aRS,5SR,9bSR)-1,3,4,4a,5,9b-hexahydro-2-methyl-5-phenyl-2H-indeno[1,2-c]pyridine (for Example 25)

This compound is obtained in a manner analogous to that described in Example 3. M.P. 83°.

EXAMPLE 55:

(4aRS,5SR,9bSR)-2-benzyl-1,3,4,4a,5,9b-hexahydro-5-phenyl-2H-indeno[1,2-c]pyridine (for Example 30)

This compound is obtained in a manner analogous to that described in Example 3. M.P. 245°–247°.

EXAMPLE 56:

(4aRS,5SR,9bRS)-2-benzyl-1,3,4,4a,5,9b-hexahydro-5-phenyl-2H-indeno[1,2-c]pyridine (for Example 31)

This compound is obtained in a manner analogous to that described in Example 6. M.P. of the hydrochloride 245°–250°.

EXAMPLE 57:

(4aRS,5SR,9bRS)-1,3,4,4a,5,9b-hexahydro-2-methyl-5-phenyl-2H-indeno[1,2-c]pyridine (for Example 33)

10 g of (4aRS,5RS,9bRS)-1,3,4,4a,5,9b-hexahydro-2-methyl-5-phenyl-2H-indeno[1,2-c]pyridine (production see Example 48, 49 or 50) are boiled at reflux with a solution of 80 g of potassium hydroxide in 200 cc of butanol for 24 hours. Working up is effected as described in Example 16, whereby (4aRS,5SR,9bRS)-1,3,4,4a,5,9b-hexahydro-2-methyl-5-phenyl-2H-indeno[1,2-c]pyridine hydrochloride is obtained. After crystallization from isopropanol the compound has a M.P. of 299°–300° (decomp.).

The production of the starting material required for Example 26 is effected as described in Example 3, for Example 27 as described in Example 1, for Example 28 as described in Example 2, for Example 29 as described in Example 16, for Example 32 as described in Example 41.

EXAMPLE 58:

(4aRS,5SR,9bSR)-1,3,4,4a,5,9b-hexahydro-2-methyl-5-phenyl-2H-indeno[1,2-c]pyridine (for Example 25)

*a.* 4-benzyl-1-methyl-3-phenyl-piperidinol-4.

15.6 g of magnesium are covered with a layer of 120 cc of absolute ether, a crystal of iodine and about 5 cc of a solution of 81.4 g of benzyl bromide in 400 cc of absolute ether are added, and the mixture is heated until the reaction commences. The remainder of the above benzyl bromide solution is then added dropwise at such a rate that the solution boils continuously, and the mixture is subsequently heated at reflux for a further 4 hours. A solution of 61.6 g of 1-methyl-3-phenyl-piperidone-4 in 300 cc of absolute ether is added dropwise at 10° to the benzyl magnesium bromide solution while stirring well, the reaction mixture is stirred at room temperature for a further 3 hours and is allowed to stand over night at room temperature. The mixture is then poured into a solution of 240 g of ammonium chloride in 1,500 cc of ice water while stirring, the entire material is filtered through diatomaceous earth, the organic phase is separated and the aqueous solution is again shaken out with ether. The combined ethereal solutions are washed with water, dried over potassium carbonate and concentrated by evaporation at reduced pressure. The residue is crystallized from hexane and yields 4-benzyl-1-methyl-3-phenyl-piperidinol-4 having a M.P. of 102°–104°.

*b.* (4aRS,5SR,9bSR)-1,3,4,4a,5,9b-hexahydro-2-methyl-5-phenyl-2H-indeno[1,2-c]pyridine.

A mixture of 200 g of polyphosphoric acid and 200 cc of xylene is preheated to 130° and a solution of 19 g of 4-benzyl-1-methyl-3-phenyl-piperidinol-4 in 40 cc of xylene is added during the course of 30 minutes while stirring vigorously. The reaction mixture is stirred at 130° for 10 hours, is cooled to 90° and poured on 600 cc of ice water. The organic phase is separated, the aqueous portion is washed once with ether and is saturated with potassium carbonate. The basic aqueous suspension is extracted with methylene chloride, the extract is washed with water and dried over potassium carbonate, whereupon the solvent is removed by evaporation at reduced pressure. The residue is distilled in a high vacuum, whereby (4aRS,5SR,9bSR)-1,3,4,4a,5,9b-hexahydro-2-methyl-5-phenyl-2H-indeno[1,2-c]pyridine distils over at 150°–155°/0.3 mm of Hg as an oil. M.P. 82°–83° from hexane.

EXAMPLE 59: (4aRS,5SR,9bSR)-1,3,4,4a,5,9b-hexahydro-2-methyl-5-phenyl-2H-indeno[1,2-c]pyridine (for Example 25)

*a.* 4-benzylidene-1-methyl-3-phenyl piperidine.

This compound may be obtained in two manners:

α. A solution of 17.0 g of benzyl bromide in 40 cc of N,N-dimethyl formamide is added dropwise at 0°–5° to a solution of 16.2 g of phosphorus acid tris-diethyl amide in 40 cc of N,N-dimethyl formamide. The cooler is removed, the temperature is allowed to rise to 40°–50° by exothermic reaction while stirring, stirring is continued at 50° for 30 minutes and a further 20 cc of N,N-dimethyl formamide are added. 5.8 g of sodium methylate are added portionwise to the reaction mixture at 0°–5°, the mixture is stirred for 30 minutes at room temperature and is again cooled to 0°. 18 g of 1-methyl-3-phenyl-piperidone-4 are added at this temperature during the course of 15 minutes, the mixture is stirred at 20°–25° for 2 ½ hours and then at 80° for 4 hours and is allowed to stand at room temperature for 10–15 hours. The dark suspension is then poured on a solution of 38 g of ammonium chloride in 500 cc of ice water and is extracted with methylene chloride. The extracts are washed with water, dried over magnesium sulphate and concentrated by evaporation at reduced pressure. The residue is distilled in a high vacuum, whereby 4-benzylidene-1-methyl-3-phenyl piperidine distils over as an oil at 165°–170°/0.03 mm of Hg (M.P. of the hydrochloride 211°–212° from acetone), in addition to a small amount of 4-benzyl-1-methyl-3-phenyl-1,2,5,6-tetrahydropyridine.

β. A solution of 11.4 g of benzyl diethyl phosphonate in 20 cc of absolute tetrahydrofuran is added dropwise to a suspension of 1.95 g of sodium amide in 30 cc of absolute tetrahydrofuran in an atmosphere of nitrogen. The mixture is stirred at room temperature for 5 hours, a solution of 9.5 g of 1-methyl-3-phenyl-piperidone-4 in 20 cc of absolute tetrahydrofuran is added at 20°–30° during the course of half an hour and the mixture is boiled at reflux for 48 hours. After cooling the solvent is removed by distillation at reduced pressure, the residue is divided between 200 cc of 2 N hydrochloric acid and 200 cc of ether and the organic phase is separated. The aqueous solution is made alkaline with a 40 percent caustic soda solution and is extracted 5 times with methylene chloride. The combined extracts are dried over magnesium sulphate and concentrated by evaporation at reduced pressure. 4 -Benzylidene-1-methyl-3-phenyl piperidine is isolated by distillation in a manner analogous to that described in section ($\alpha$).

b.  (4aRS,5SR,9bSR)-1,3,4,4a,5,9b-hexahydro-2-methyl-5-phenyl-2H-indeno[1,2-c]pyridine.

20 g of 4-benzylidene-1-methyl-3-phenyl piperidine are added to 200 cc of polyphosphoric acid at 20°–30°, and the reaction mixture is heated to 130° during the course of 2 hours. The reaction mixture is stirred at this temperature for a further 2 hours, is cooled to 90° and is further worked up as described in Example 54.

EXAMPLE 60:

(4aRS,5SR,9bSR)-1,3,4,4a,5,9b-hexahydro-2-methyl-5-phenyl-2H-indeno[1,2-c]pyridine (for Example 25)

a. 4-benzyl-1-methyl-3-phenyl-1,2,5,6-tetrahydropyridine.

20 g of 4-benzyl-1-methyl-3-phenyl-piperidinol-4 [production see Example 58, section (a)] and 160 cc of 75 percent sulphuric acid are stirred at 60° for 20 hours. After cooling the reaction solution is diluted with 500 cc of water, is made alkaline with a 40 percent caustic soda solution and is extracted with methylene chloride. The extracts are washed with water, dried over magnesium sulphate and concentrated by evaporation at reduced pressure. The residue is dissolved in 25 cc of absolute ethanol, the pH of the solution is adjusted to 3 with a solution of hydrogen chloride in ethanol and is allowed to crystallize at room temperature. Fractional crystallization first yields a small amount of 4-benzylidene-1-methyl-3-phenyl-piperidine hydrochloride, having a M.P. of 211°–212°, and then 4-benzyl-1-methyl-3-phenyl-1,2,5,6-tetrahydropyridine hydrochloride, having a M.P. of 178°–179°.

b.  (4aRS,5SR,9bSR)-1,3,4,4a,5,9b-hexahydro-2-methyl-5-phenyl-2H-indeno[1,2-c]pyridine.

20 g of 4-benzyl-1-methyl-3-phenyl-1,2,5,6-tetrahydropyridine are treated with 200 g of polyphosphoric acid in a manner analogous to that described in Example 59, section (b), whereby (4aRS,5SR,9bSR)-1,3,4,4a,5,9b-hexahydro-2-methyl-5-phenyl-2H-indeno-[1,2-c]pyridine is obtained after distillation.

EXAMPLE 61:

4-($\alpha$-hydroxybenzyl)-1-methyl-3-phenyl piperidine (for Example 54)

This compound is obtained in a manner analogous to that described in Example 42. M.P. 153°–157°.

EXAMPLE 62:

1-benzyl-4-($\alpha$-hydroxybenzyl)-3-phenyl piperidine (for Example 55)

This compound is obtained in a manner analogous to that described in Example 42. M.P. 84°–87°.

What is claimed is:

1. A (4aRS,5SR,9bSR) compound of formula:

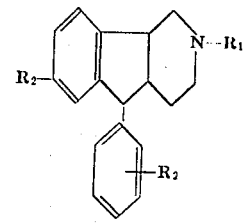

in which either $R_1$, $R_2$ and $R_3$ are hydrogen, or $R_1$ is hydrogen, lower alkyl, lower alkenyl or lower alkinyl, $R_2$ is chlorine, bromine, fluorine or lower alkyl, and $R_3$ is hydrogen, chlorine, bromine, fluorine, lower alkyl, lower alkylthio or lower alkoxy, or trifluoromethyl, or a pharmaceutically acceptable acid addition salt thereof.

2. A (4aRS,5SR,9bRS) compound of formula:

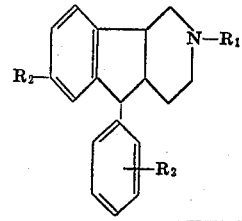

in which either $R_1$, $R_2$ and $R_3$ are hydrogen, or $R_1$ is hydrogen, lower alkyl, lower alkenyl or lower alkinyl, $R_2$ is chlorine, bromine, fluorine or lower alkyl, and $R_3$ is hydrogen, chlorine, bromine, fluorine, lower alkyl, lower alkylthio or lower alkoxy, or trifluoromethyl, or a pharmaceutically acceptable acid addition salt thereof.

3. The compound of claim 1, which is (4aRS,5SR,9bSR)-7-chloro-5-p-chlorophenyl-1,3,4,4a,5,9b-hexahydro-2-methyl-2H-indeno[1,2-c]pyridine.

4. The compound of claim 2, which is (4aRS,5SR,9bRS)-7-chloro-5-p-chlorophenyl-1,3,4,4a,5,9b-hexahydro-2-methyl-2H-indeno[1,2-c]pyridine.

5. The compound of claim 1, which is (4aRS,5SR,9bSR)-2,7-dimethyl-1,3,4,4a,5,9b-hexahydro-5-p-tolyl-2H-indeno[1,2-c]pyridine.

6. The compound of claim 2, which is (4aRS,5SR,9bRS)-7-fluoro-5-p-fluorophenyl-1,3,4,4a,5,9b-hexahydro-2-methyl-2H-indeno[1,2-c]pyridine.

7. The compound of claim 1, which is (4aRS,5SR,9bSR)-7-fluoro-5-p-fluorophenyl-1,3,4,4a,5,9b-hexahydro-2-methyl-2H-indeno[1,2-c]pyridine.

8. The compound of claim 1, which is (4aRS,5SR,9bSR)-2-ethyl-1,3,4,4a,5,9b-hexahydro-7-methyl-5-p-tolyl-2H-indeno[1,2-c]pyridine.

9. The compound of claim 1, which is (4aRS,5SR,9bSR)-2-isopropyl-1,3,4,4a,5,9b-hexahydro-7-methyl-5-p-tolyl-2H-indeno[1,2-c]pyridine.

10. The compound of claim 1, which is (4aRS,5SR,9bSR)-2-allyl-1,3,4,4a,5,9b-hexahydro-7-methyl-5-p-tolyl-2H-indeno[1,2-c]pyridine.

11. The compound of claim 1, which is (4aRS,5SR,9bSR)-2,2'-propinyl-1,3,4,4a,5,9b-hexahydro-7-methyl-5-p-tolyl-2H-indeno[1,2-c]pyridine.

12. The compound of claim 1, which is (4aRS,5SR,9bSR)-2-isopropyl-1,3,4,4a,5,9b-hexahydro-7-chloro-5-p-chlorophenyl-2H-indeno[1,2-c]pyridine.

13. The compound of claim 2, which is (4aRS,5SR,9bRS)-2-ethyl-1,3,4,4a,5,9b-hexahydro-7-chloro-5-p-chlorophenyl-2H-indeno[1,2-c]pyridine.

14. The compound of claim 2, which is (4aRS,5SR,9bRS)-2-n-propyl-1,3,4,4a,5,9b-hexahydro-7-chloro-5-p-chlorophenyl-2H-indeno[1,2-c]pyridine.

15. The compound of claim 2, which is (4aRS,5SR,9bRS)-2-isopropyl-1,3,4,4a,5,9b-hexahydro-7-chloro-5-p-chlorophenyl-2H-indeno[1,2-c]pyridine.

16. The compound of claim 2, which is (4aRS,5SR,9bRS)-2-allyl-1,3,4,4a,5,9b-hexahydro-7-chloro-5-p-chlorophenyl-2H-indeno[1,2-c]pyridine.

17. The compound of claim 2, which is (4aRS,5SR,9bRS)-2-ethyl-1,3,4,4a,5,9b-hexahydro-7-methyl-5-p-tolyl-2H-indeno[1,2-c]pyridine.

18. The compound of claim 2, which is (4aRS,5SR,9bRS)-1,3,4,4a,5,9b-hexahydro-2,7-dimethyl-5-phenyl-2H-indeno[1,2-c]pyridine.

19. The compound of claim 2, which is (4aRS,5SR,9bRS)-2-methyl-1,3,4,4a,5,9b-hexahydro-7-methyl-5-m-tolyl-2H-indeno[1,2-c]pyridine.

20. The compound of claim 2, which is (4aRS,5SR,9bRS)-2-methyl-1,3,4,4a,5,9b-hexahydro-7-methyl-5-p-tolyl-2H-indeno[1,2-c]pyridine.

21. The compound of claim 2, which is (4aRS,5SR,9bRS)-2-methyl-1,3,4,4a,5,9b-hexahydro-7-methyl-5-p-methoxyphenyl-2H-indeno[1,2-c]pyridine.

22. The compound of claim 2, which is (4aRS,5SR,9bRS)-1,3,4,4a,5,9b-hexahydro-5-phenyl-2H-indeno[1,2-c]pyridine.

23. The compound of claim 1, which is (4aRS,5SR,9bSR)-1,3,4,4a,5,9b-hexahydro-5-phenyl-2H-indeno[1,2-c]pyridine.

24. The compound of claim 1, which is (4aRS,5SR,9bSR)-1,3,4,4a,5,9b-hexahydro-7-methyl-5-p-tolyl-2H-indeno[1,2-c]pyridine.

25. The compound of claim 1, which is (4aRS,5SR,9bSR)-1,3,4,4a,5,9b-hexahydro-7-chloro-5-p-chlorophenyl-2H-indeno[1,2-c]pyridine.

26. The compound of claim 2, which is (4aRS,5SR,9bRS)-7-chloro-5-p-chlorophenyl-1,3,4,4a,5,9b-hexahydro-2H-indeno[1,2-c]pyridine.

27. The compound of claim 2, which is (4aRS,5SR,9bRS)-1,3,4,4a,5,9b-hexahydro-7-methyl-5-p-tolyl-2H-indeno[1,2-c]pyridine.

* * * * *